United States Patent

Brewer et al.

[11] 3,977,468
[45] Aug. 31, 1976

[54] WELL BORE CALIPER AND CENTRALIZER APPARATUS HAVING ARTICULATED LINKAGE

[75] Inventors: James Edward Brewer; Raymond Earl Roesner, both of Houston, Tex.

[73] Assignee: Dresser Industries, Inc., Dallas, Tex.

[22] Filed: Oct. 28, 1975

[21] Appl. No.: 625,993

[52] U.S. Cl. ............................. 166/241; 33/178 F; 324/10
[51] Int. Cl.² ........................................ E21B 17/10
[58] Field of Search .................. 166/100, 213, 241; 324/10; 33/178 F

[56] References Cited
UNITED STATES PATENTS

| | | | |
|---|---|---|---|
| 2,899,633 | 8/1959 | Smith et al. | 166/241 |
| 3,092,182 | 6/1963 | Blagg | 166/241 |
| 3,423,671 | 1/1969 | Vezin | 324/10 |
| 3,555,689 | 1/1971 | Cubberly, Jr. | 166/241 |
| 3,915,229 | 10/1975 | Nicolas | 166/241 |

*Primary Examiner*—James A. Leppink
*Attorney, Agent, or Firm*—William E. Johnson, Jr.

[57] ABSTRACT

An earth borehole instrument has a plurality of wear link members adapted to engage the borehole walls which are pivotally attached through articulated mechanical arms both to a fixed collar and to a spring-loaded slidable collar on the instrument. The articulated arms for each wear link member consist of a pair of power arms which are each pivoted at a center point on the wear link adapted to engage the borehole wall and a pair of sensing arms which are pivotally connected, respectively, to the ends of the wear link. In an alternative embodiment, a bow spring is mounted on the underside of the power arms for maintaining the wear link flat against the borehole wall.

4 Claims, 4 Drawing Figures

WELL BORE CALIPER AND CENTRALIZER APPARATUS HAVING ARTICULATED LINKAGE

BACKGROUND OF THE INVENTION

This invention relates generally to earth borehole apparatus, and specifically to caliper and centralizing apparatus having borehole wall-engaging faces urged against the borehole wall.

It is well known in the art of well logging to use caliper and centralizing instruments having a plurality of borehole wall-engaging members and having means, for example, a spring, to urge the borehole wall-engaging members against the borehole wall. For example, as discussed hereinafter with regard to the prior art, it has been known to use a bow spring interconnected between two rigid arms to contact the borehole walls. With such instruments, the bow spring generally has to have a large radius and the rigid arms have to be maintained at a relatively low angle of approximately no greater than 20° to 25° to keep the connecting bow spring from overstressing the spring material. With such devices, there is generally a great distance between the pivot points on the rigid arms.

It is therefore a primary object of the present invention to provide a new and improved well bore instrument having means to centralize the instrument within the borehole;

It is also an object of the present invention to provide a new and improved well bore apparatus having means to caliper the earth borehole.

The objects of the present invention are accomplished, generally, by apparatus which includes an elongated support member adapted for movement through an earth borehole, a borehole-engaging member having first and second ends and a centralized pivot point, a first arm member connected between said centralized pivot point and a fixed pivot point on said support member, a second arm member connected between said centralized pivot point and a slidable pivot point on said support member, a third arm member pivotally connected to the said first end of said borehole-engaging member and slidably connected to said first arm member intermediate the ends of said first arm member, and a fourth arm member pivotally connected to the said second end of said borehole-engaging member and slidably connected to said second arm member intermediate the ends of said second arm member.

As an additional feature, a hidden bow spring is attached to the underside of the first and second arm member to maintain the borehole-engaging member flat against the borehole wall.

These and other objects, features and advantages of the present invention will be more readily appreciated from a reading of the following detailed specification and drawing, in which.

Figure 1:
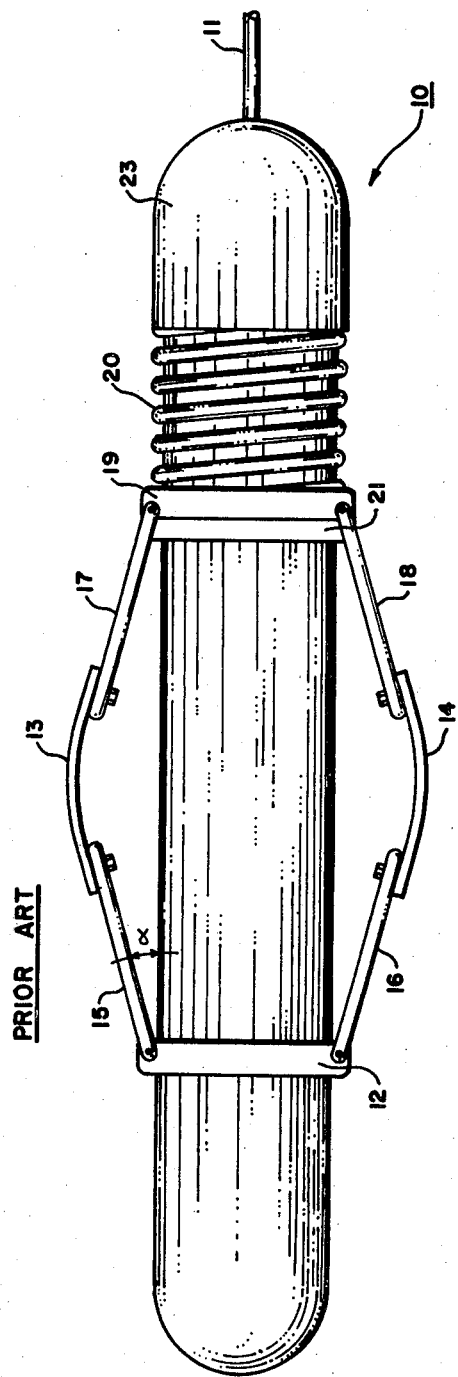
FIG. 1 is an elevated view of an earth borehole apparatus which is known in the prior art as being useful for centralizing earth borehole instruments.

Referring now to the drawing in more detail, especially to FIG. 1, a prior art centralizing instrument 10 is illustrated wherein the instrument 10 is adapted to traverse an earth borehole (not illustrated) by means of a hoisting cable 11 which would normally be connected to a hoisting unit at the earth's surface in a manner well known and conventional in the art. The instrument 10, sometimes referred to herein as an elongated support member, is generally cylindrical in shape and sized to pass through the earth boreholes of interest. A stationary collar 12 is attached to the support member 10. A plurality of borehole-engaging bow springs 13 and 14 are rigidly attached, respectively, to arm members 15 and 16 which in turn are each pivotally connected to the stationary collar 12. A second pair of rigid arm members 17 and 18 are rigidly connected at their first ends to the bow spring members 13 and 14, respectively, and are pivotally connected at their other ends to a slidable collar 19 which is spring loaded by means of the spring 20 against a stationary collar 21 which is affixed to the main housing of the instrument 10. Although not illustrated, a transducer rod can be attached to the slidable collar 19 and be adapted to be movable within the upper portion 23 of the main instrument housing 10. It should be appreciated, of course, that such a conventional transducer assembly would be used when calipering an earth borehole and that no such transducer is necessary when the instrument is used for centralizing purposes only.

As illustrated in FIG. 1, the arms 15 and 16 each make an angle $\alpha$ with the main instrument housing. With such a prior art device, the angle $\alpha$ has to be maintained at a low angle, preferably no greater than 20° to 25°, to keep the connecting bow springs 13 and 14 from overstressing the spring material. Consequently, because of the low angle and the need to have the bow springs touch the borehole wall, a considerable distance is needed between the collars 12 and 19, thus resulting in a rather long instrument. Furthermore, such prior art instruments have the disadvantage of uneven wearing on the bow springs 13 and 14 while traversing an earth borehole.

In the operation of the prior art apparatus constructed in accordance with FIG. 1, as the instrument 10 traverses an earth borehole having varying diameters therein, the spring 20 forces the bow springs 13 and 14 against the borehole wall and thus maintains the main instrument housing centralized within the borehole. Although not illustrated, the instrument 10 would normally contain various well logging instruments and/or completion equipment well known in the well logging art.

Figure 2:
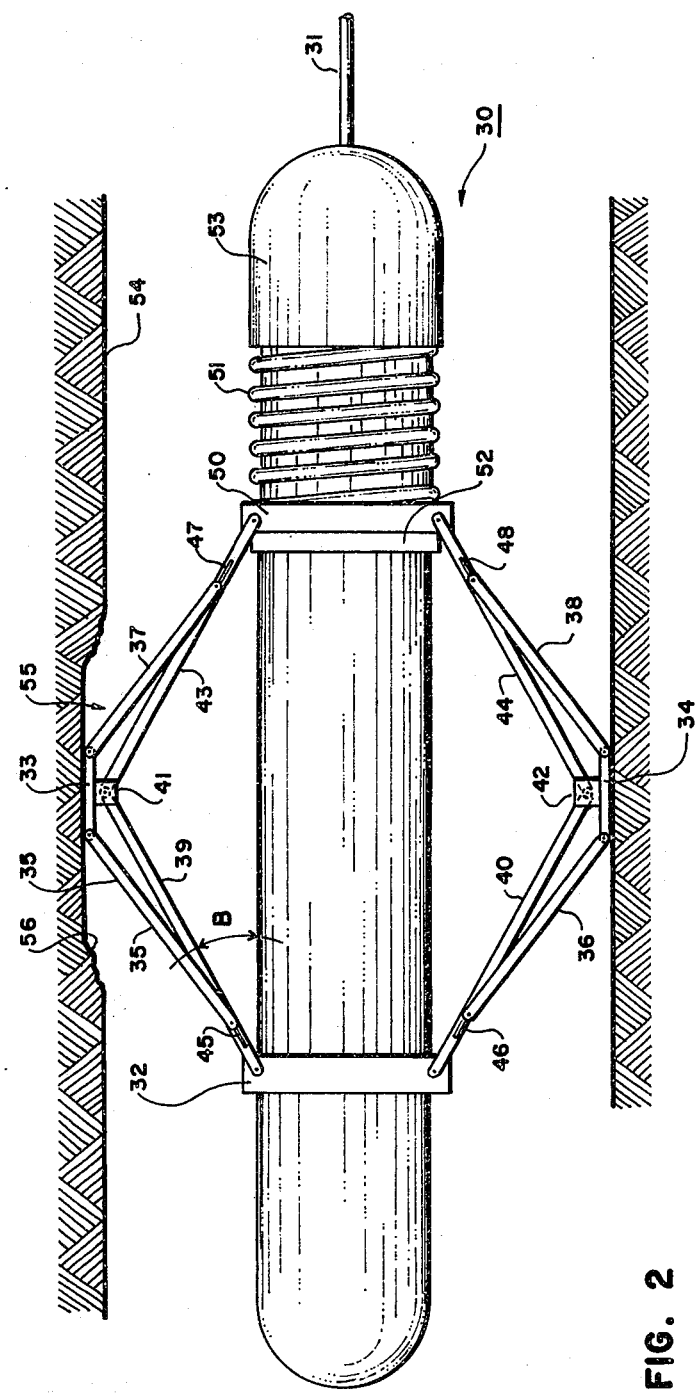
FIG. 2 is an elevated view of an earth borehole centralizing apparatus in accordance with the present invention.

Referring now to FIG. 2, there is illustrated an instrument 30 constructed in accordance with the present invention which is adapted to likewise traverse an earth borehole having a wall 54 by means of a cable 31 in a manner conventional and well known in the art as was discussed with respect to the prior art apparatus of FIG. 1. The elongated support member 30 is generally cylindrical in shape and sized to pass through the earth boreholes of interest. A stationary collar 32 is attached to the support member 30. A pair of borehole-engaging wear links 33 and 34 are pivotally attached at their first ends, respectively, to a pair of arm members 35 and 36. A second pair of arm members 37 and 38 are pivotally connected at their first ends to the second ends, respectively, of the wear links 33 and 34. A third pair of arms 39 and 40 are pivotally connected to centralized pivot points 41 and 42, respectively, on the wear links 33 and 34 and are pivotally connected at their other ends, respectively, to the stationary collar 32. A fourth pair of arm members 43 and 44 are pivotally connected at their first ends, respectively, to the pivot points 41 and 42 on the wear links 33 and 34, and at their second ends, respectively, to the spring-loaded sliding collar 50. The spring 51 causes the sliding collar 50 to push against a stationary collar 52 which is affixed to the main housing of the support member 30.

The other ends of the arms 35, 36, 37 and 38 are slidably connected, respectively, by sliding pins to intermediate grooves 45, 46, 47 and 48 in the arms 39, 40, 43 and 44.

Figure 3:
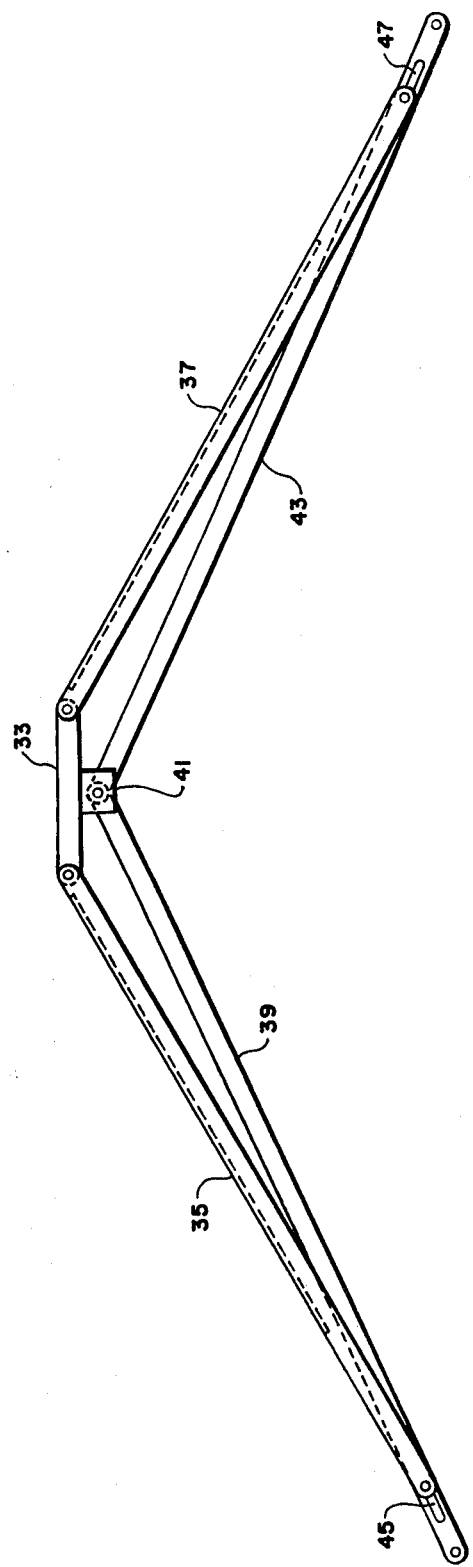
FIG. 3 is an enlarged view of one of the wear link assemblies illustrated in FIG. 2 in accordance with the present invention.

The wear link assembly including the wear link 33 is illustrated in greater detail in FIG. 3.

In understanding the operation of the apparatus illustrated and described with respect to FIGS. 2 and 3, it should be appreciated that the two wear link assemblies illustrated in FIG. 2 are identical and that only the operation of the wear link assembly having the wear link 33 need be described in any detail. Although not illustrated, as was discussed with respect to the prior art device of FIG. 1, a transducer rod can be connected to the slidable collar 50 and be adapted to be movable within the upper portion 53 of the support member 30.

Referring now to the operation of the apparatus described with respect to FIGS. 2 and 3, it should be appreciated that as the instrument 30 traverses an earth borehole having a wall 54, the borehole will change diameter, for example, the washed-out portion 55 illustrated in FIG. 2. After the instrument is located within the washed-out portion, and as it moves along the borehole wall, whenever the wear link 33 engages the face 56 of the borehole wall, it would normally, without benefit of the present invention, tend to restrict further passage of the instrument. However, with the apparatus built in accordance with FIG. 2, whenever the wear link 33 strikes the face 56, the arm 35 will slide down in the groove 45 and articulate around the corner caused by the reduction in the borehole diameter. Thus, the arms 35, 36, 37 and 38 can be considered sensing arms and the arms 39, 40, 43 and 44 can be considered power arms. The sensing arms sense the hole size and transmit the force to the wear link and the power arms. Thus, the sensing arms allow the use of a wear link on top of the power arms and maintain the wear link in contact with the borehole wall and also help to prevent the instrument from being jammed while traversing the borehole.

Figure 4:
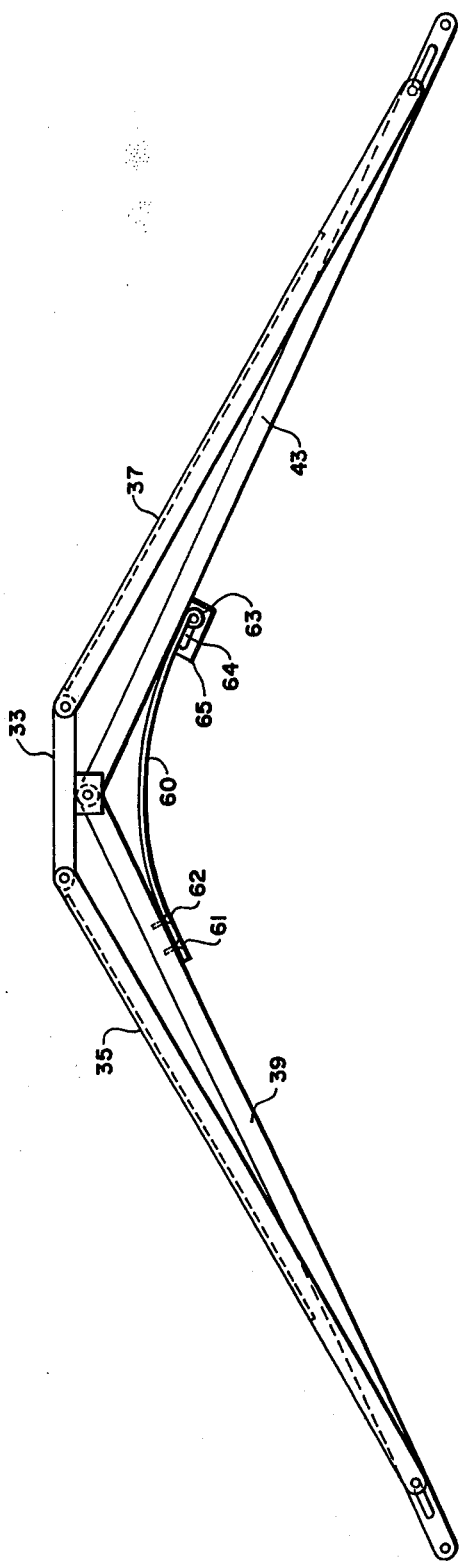
FIG. 4 is an enlarged view of a single borehole-engaging assembly according to an alternative embodiment of the invention.

Referring now to FIG. 4, an alternative embodiment of the present invention is illustrated wherein the identical wear link assembly of FIG. 3 is illustrated but in addition, a bow spring 60 is rigidly attached to the underside of the power arm 39 by means of rivets or other such conventional devices 61 and 62. The other end of the bow spring 60 has a pin 63 adapted to slide in a groove 64 in a housing 65 which is fixedly attached to the underside of the rigid power arm 43. Thus, as the diameter of the borehole changes, the pin 63 slides back and forth within the slot 64 while urging the wear link 33 substantially flat against the borehole wall.

Further in the operation of the instrument constructed in accordance with FIG. 4, it should be appreciated that the sliding feature of the pin 63 in slot 64 helps to transmit force to the underside of the wear link 33 and also allows the arms 39 and 43 to collapse back to the body of the support member 30 if desired.

In comparing the prior art apparatus of FIG. 1 with the apparatus of FIGS. 2, 3 and 4 build in accordance with the present invention, it should be understood that when the bow spring is on the exterior of the rigid mechanical arms, as in the prior art, such a spring has to function both as a strength member and as a spring. However, by utilizing the apparatus of FIGS. 2, 3 and 4, the angle $\beta$ between the mechanical arm 39 and the support member 30 can be a greater angle, for example, 30° to 35°, which allows the overall apparatus to have a smaller length dimension. Furthermore, when using the hidden bow spring as illustrated in FIG. 4, the spring does not have to act as a strength member.

Thus it should be appreciated that there have been illustrated and described herein the preferred embodiments of apparatus which find utility as either centralizing tools or as calipering instruments in accordance with the present invention. However, those skilled in the art will recognize that obvious modifications can be made to the preferred embodiments without departing from the spirit of the invention. For example, while one of the illustrated embodiments shows a pair of wear link assemblies, those skilled in the art will recognize that such instruments generally contain three or four such assemblies to better maintain the instrument centralized in the borehole. Furthermore, although not illustrated, the wear links can be fabricated to match the curvature of the borehole wall if desired.

The embodiments of the invention in which an exclusive property or privilege is claimed are defined as follows:

1. An apparatus for traversing an earth borehole, comprising:
    an elongated support member adapted for movement through an earth borehole;
    a borehole-engaging member having first and second ends and a centralized pivot point;
    a first arm member connected between said centralized pivot point and a fixed pivot point on said support member;
    a second arm member connected between said centralized pivot point and a slidable pivot point on said support member;
    a third arm member pivotally connected to the said first end of said borehole-engaging member and slidably connected to said first arm member intermediate the ends of said first arm member; and
    a fourth arm member pivotally connected to the said second end of said borehole-engaging member and slidably connected to said second arm member intermediate the ends of said second arm member.

2. The apparatus according to claim 1, including in addition thereto, spring means acting in conjunction with said sliding pivot point to extend said second arm member.

3. The apparatus according to claim 1, comprising in addition thereto, a bow spring having first and second ends, one of said spring ends being fixedly attached to the underside of one of said first and second arm members and being slidably attached to the underside of the other of said first and second arm members.

4. The apparatus according to claim 3, wherein said first end of said bow spring is fixedly attached to the underside of said first arm member and the second end of said bow spring is slidably attached to the underside of said second arm member.

* * * * *